Jan. 5, 1971 R. W. H. KELLER 3,553,698
ELECTRONIC LOCATING AND FINDING APPARATUS
Filed Dec. 23, 1968 7 Sheets-Sheet 1

Richard W.H. Keller,
INVENTOR.
BY.

GOLOVE & KLEINBERG,
ATTORNEYS.

Richard W.H. Keller,
INVENTOR.
BY.

GOLOVE & KLEINBERG,
ATTORNEYS.

Richard W. H. Keller,
INVENTOR.
BY.

GOLOVE & KLEINBERG,
ATTORNEYS.

Richard W.H. Keller,
INVENTOR.
BY.

GOLOVE & KLEINBERG,
ATTORNEYS.

ELECTRONIC LOCATING AND FINDING APPARATUS

Filed Dec. 23, 1968 7 Sheets-Sheet 5

Richard W. H. Keller,
INVENTOR.
BY.

GOLOVE & KLEINBERG,
ATTORNEYS.

ELECTRONIC LOCATING AND FINDING APPARATUS

Richard W. H. Keller,
INVENTOR.
BY.

GOLOVE & KLEINBERG,
ATTORNEYS.

Richard W. H. Keller,
INVENTOR.
BY.

GOLOVE & KLEINBERG,
ATTORNEYS.

United States Patent Office 3,553,698
Patented Jan. 5, 1971

3,553,698

ELECTRONIC LOCATING AND FINDING APPARATUS

Richard W. H. Keller, La Mesa, Calif., assignor to Cubic Corporation, San Diego, Calif.

Filed Dec. 23, 1968, Ser. No. 785,885
Int. Cl. G01s 3/48
U.S. Cl. 343—113 12 Claims

ABSTRACT OF THE DISCLOSURE

Apparatus for enabling a vehicle to locate and "home" upon a remote radiation source. Two pairs of antennas on the vehicle provide a unique signal when the vehicle is on a vector to the source. A third antenna pair can be used, in combination with on-board navigational equipment, to signal when the vehicle is vertically aligned with the source.

The present invention relates to a continuous wave, radio direction finder, and more particularly to apparatus on a moving vehicle employing interferometric techniques to guide the vehicle to a remote transmitter.

The assignee of the applicant, in 1963, in performance of a contract AF 33 (657)-171, delivered an "Interferometer Radio Direction Finder System," which was designed to locate a source of radio energy with reference to a plane which was the perpendicular bisector of a "base-line" connecting two receiving antennas. In that apparatus, the antenna array included a pair of matched, corner-reflector antennas fastened to a mast adapted to be mounted to a balloon gondola.

That system operated on the physical principle that a radio wave propagated through space changes phase as a function of frequency and distance. For each fraction of a "wavelength" of distance separating the transmitter and receiver, the phase of the signal relative to the phase of a reference signal is "shifted" by that fraction of a cycle. The above-described system measured the phase difference as between signals received from a remote transmitter at a pair of accurately spaced antennas, and from the difference in phase between the received signals, the angle between the bisector of the antenna base line and a vector from the remote transmitter could be calculated.

The separation of the antennas along the base line is a function of wavelength of the received signal. The extent of separation is determined by the intended angular range over which an unambiguous angular indication is desired. In the disclosed system, the spacing was set at $1.5\lambda$ to provide unambiguous indications for a range of $\pm 9.0°$ from the plane of the bisector.

In general operation, the system received a signal at each of the two antennas from the common radiating source. The signals were applied to a hybrid ring which mixed the signals, providing a sum and a difference output to a receiver. These "sum" and "difference" signals were amplified and combined to develop data outputs. An "angle error signal," which was proportional to the difference in phase of the signals received at the antennas, was a D.C. signal whose magnitude was proportional to and representative of the angular displacement from the center line. The polarity of the signal indicated direction, right or left. The "sum" output of the ring was used as a reference. As an output signal, the "sum" magnitude was a maximum when the remote transmitter was aligned with the bisector of the base line. While the output signals could be transmitted directly to utilization apparatus, these were also displayed on appropriate meters, so that an indicated null of the "error" output, simultaneous with a maximum "sum" signal, provided a clear unambiguous indication when the remote transmitter crossed the reference plane.

Subsequently, applicant's assignee proposed a pair of the above-described systems as a portable system for acquiring targets for tracking telescopes, or other narrow beam tracking devices. Since each component system provided an indication of the relative angle, as between a reference plane and a remote source, two systems, oriented to be relatively orthogonal, provided a pair of intersecting relatively orthogonal reference planes, which, in combination, could provide a signal when the vector to a remote transmitter coincided with the line of intersection of the reference planes.

Both of the prior system applications contemplated a moving, remote transmitter and a relatively fixed site for the receivers. In some instances, a fixed antenna orientation was provided. In the target acquisition system, a movable antenna network physically aligned with a "boresight" vector of other associated tracking equipment was utilized to coincide a vector from the transmitter with the boresight vector. Parallax error could be ignored since the tracking equipment could "lock" onto a target once it was "acquired." In operation, the prior art systems either signalled when a remote transmitter passed through the reference plane, or aided in the acquisition of targets by narrow beam systems such as a medium focal length, optical tracking telescope, or narrow beam tracking radar. When the two antenna pairs were mounted on a steerable platform or pedestal, a remote moving target could be acquired by applying the system output signals to appropriate servo systems.

In recent years, there has arisen a need for a system that can direct a moving vehicle to a stationary, or relatively stationary, remote transmitter. In such an application, the remote transmitter may be a weak radiating energy source with a substantially omnidirectional radiation pattern. It would be desirable to bring the moving vehicle to the transmitter. Further, the situation may be complicated in that the transmitter may be visually obscured, and, accordingly, occupants of the search vehicle might require a unique signal when the distance between the transmitter and the vehicle is at a minimum.

A typical situation in which such a problem is created, and wherein the need for such equipment is greatest, would be in a "search and rescue" operation. An individual "lost" in remote and relatively inaccessible terrain, such as wilderness areas, could, with a reasonably simple radio transmitter, be found by a rescue vehicle homing on the transmitter. If the rescue vehicle is a helicopter and the terrain was such to prevent landing, according to the present invention, the vehicle could "home" on the transmitter and accurate signals would be provided, sufficient to enable the pilot to hover directly over the transmitter while appropriate rescue apparatus was lowered to the ground.

The prior art radio interferometer, as it exists, cannot be directly employed in such a system. Accordingly, the present invention has been provided which relies on the basic technique of the prior art, but which fills the need for such "search and rescue" homing apparatus. In a preferred embodiment, three antenna pairs are mounted on the rescue vehicle. One pair, mounted along the vehicle longitudinal axis, is used to derive a "fore-aft" steering signal. A second antenna pair, mounted at right angles to the longitudinal axis, provides "left-right" steering signals. Since the antenna pairs may be fixedly mounted to the vehicle with the antenna base line defining a predetermined reference plane, it may be necessary to provide a second, auxiliary pair of "left-right" steering antennas, also perpendicular to the vehicle longitudinal axis, but which are mounted to furnish increased sensitivity in the "forward" direction, relative to the normal vehicle attitude.

The main, left-right antenna pair and the fore-aft pair define a reference plane for the vehicle that is substantially parallel to the ground. The steering and control signals bring the vehicle into alignment with the transmitter on a line that is directly perpendicular to the reference plane. The auxiliary pair of "left-right" antennas can be used for target acquisition from a relatively remote location, and appropriate steering signals can be provided to the vehicle operator.

Because of problems which stem from the characteristics of an airborne vehicle, appropriate signals are derived from existing on-board attitude reference equipment, such as vertical gyros, stable-platforms, and the like, so that "fore-aft" angle measurements are compensated for vehicle attitude, precluding the interpretation of an attitude change as a change in location of the target transmitter. Pitch and roll information, derived from the existing on-board equipment, enables appropriate corrections to the angle measuring equipment.

The present invention also provides appropriate outputs to existing avionics display equipment, so that onboard indicators can be driven by the equipment of the present invention to furnish the vehicle operator with a "left-right" steering signal and a "fore-aft" hover signal. If a vertical and horizontal cross-pointer type display is utilized, the centered vertical bar represents alignment on a vector to the target. The horizontal bar, which is initially at the top of the instrument, would then move toward the center of the instrument as the transmitter is approached. When the transmitter is directly below the vehicle, the horizontal bar is centered, as well. If the vehicle passes over the transmitter on the same course, the horizontal bar would move in to the lower half of the display area.

In the preferred embodiment of the present invention, two receiver-processor units are installed in a vehicle. Three antenna pairs are mounted to the exterior of the vehicle: a fore-aft pair, aligned with the longitudinal vehicle axis; a first, or acquisition, left-right antenna pair, aligned at right angles to the longitudinal axis and oriented to be "forward-looking" with respect to the normal in-flight attitude of the vehicle; and a second, or hover, right-left antenna pair also mounted perpendicular to the longitudinal axis, and oriented so that, in conjunction with the fore-aft pair, the vehicle can provide can provide a signal when positioned directly over the transmitter.

In the preferred embodiment, Archimedes spiral antennas have been substituted for the corner reflector antennas of the prior art system. The preferred embodiment, moreover, is a completely passive system requiring an active radiating source as a target. The spiral antennas, utilized in the present invention, permit the transmitter antenna to be oriented in any attitude or position. Further, the Archimedes spiral antenna is substantially planar and may be flush mounted on the vehicle to provide little or no aerodynamic drag. A spiral antenna also provides a fairly wide range of frequencies over which it is sensitive, and provides for a high degree of electrical isolation between proximate units.

Both receiver-processors are connected to a control/interface unit, which is also connected to the vehicle orientation sensors and to the operator displays.

The preferred embodiment is adapted for installation on a vehicle, such as a helicopter, which has a hovering capability. In alternative embodiments, the apparatus can be installed aboard other aircrafts which, without the hover capability, can still, nevertheless, either sginal the precise location of the target transmitter or can loiter over the target until other more suitable vehicles can reach the target.

The novel features which are believed to be characteristic of the invention, both as to organization and method of operation, together with further objects and advantages thereof will be better understood from the following description considered in connection with the accompanying drawings in which several preferred embodiments of the invention are illustrated by way of example. It is to be expressly understood, however, that the drawings are for the purpose of illustration and description only and are not intended as a definition of the limits of the invention.

Figure 1:
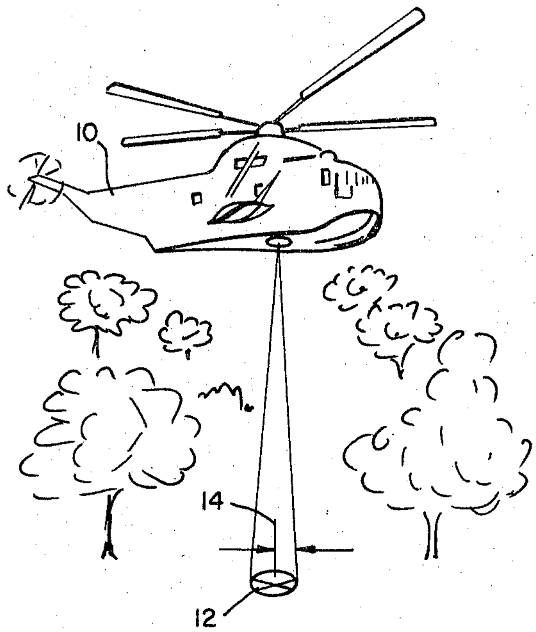
FIG. 1 is a perspective view of a proposed utilization for a preferred embodiment of an electronic location finder according to the present invention.

Turning first to FIG. 1, a potential area of use of a preferred embodiment of the present invention is illustrated. A "search and rescue" vehicle such as a helicopter 10 is provided with an Electronic Location Finder system (ELF), according to the present invention. A remote transmitter 12 having an antenna 14 is at a location unknown to the vehicle 10. The transmitter may be located in relatively inaccessible terrain and may even be visually obscured from the search vehicle 10.

The locating system, according to the present invention, provides steering signals to the vehicle operator, in this example, the pilot of helicopter 10, to bring the vehicle into proximity with the transmitter 12. From these signals, the helicopter can be directed to hover directly over the transmitter 12 with an acceptably small Circular Error Probability which, at a 300 ft. altitude, might be as little as 11 ft.

Figure 2:
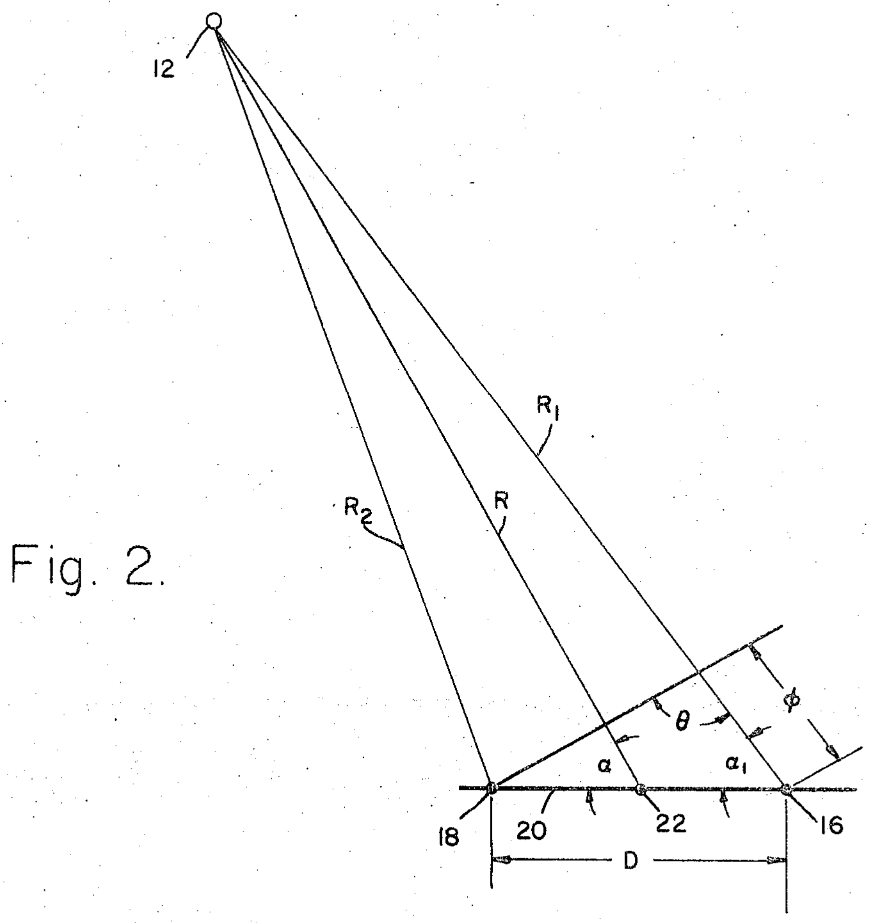
FIG. 2 is a diagram of the geometric relationships involved in the electronic angle measuring equipment of the present invention.

FIG. 2 illustrates the angular relationship as between a remote transmitter and electronic angle measuring equipment of the type utilizing a pair of antennas along a base line. As shown in FIG. 2, a remote transmitter 12 radiates electromagnetic energy waves. A pair of antennas 16, 18 are arranged along a base line 20 separated by a distance "D." A signal from the transmitter 12 goes along a path having a length $R_1$ to the first antenna 16, and along a different path of length $R_2$ to the second antenna 18. The distance between the signal source and a point 22 midway between the antennas on the base line is an average distance R.

According to well known physical principles, the phase shift of an electromagnetic wave propagated through space at a known velocity is proportional to the distance travelled and to the wave length. For example, a phase shift of 360° is measured for each metre along the propagation path of a 300 mHz. wave in free space. Since the phase shift is proportional to the distance travelled, the phase angle difference, measured at the pair of spaced antennas, is proportional to the difference in the path lengths from a common source to the antennas.

As illustrated in FIG. 2, the two antennas 16, 18 on the common base line 20 form a triangle with the signal source 12. The phase difference between the signals received by the two antennas can be expressed, in wavelengths ($\lambda$) of the carrier signal as $$\phi=n\lambda=R_1-R_2 \quad (1)$$

If R is very much greater than D, and $\theta=90°$, $\alpha$ approximately equals $\alpha_1$ $$R_1-R_2=\phi=D \cos \alpha \simeq D \cos \alpha_1 \quad (2)$$

$\alpha$ is defined as the direction angle of the line joining the source 12 to the center 22 of the base line 20. Since the phase difference can be measured, and the base line length D is known, the direction cosine and, therefore, the direction angle can be determined directly:

$$\cos \alpha=\frac{\phi}{D} \quad (3)$$

Since, in the present invention, it is not necessary to determine quantitatively, the angle $\alpha$, but rather to reorient the base line in space until $\alpha=90°$ and $R_1=R_2$, it is only necessary that the base line be oriented such that $\phi$ approaches zero. To assure unambiguous direction information, the base line D is made to equal to or less than $\frac{1}{2}\lambda$, and, consequently, $\phi$ is never greater than $\lambda/2$ or 180°.

In alternative embodiments, longer base lines may be used for greater sensitivity and higher accuracy. The sensitivity of the system is directly related to the magnitude of the base line, so that other wavelength, related spacings, if employed, impose a concomitant limitation on the conical angle of unambiguous direction.

Figure 3:
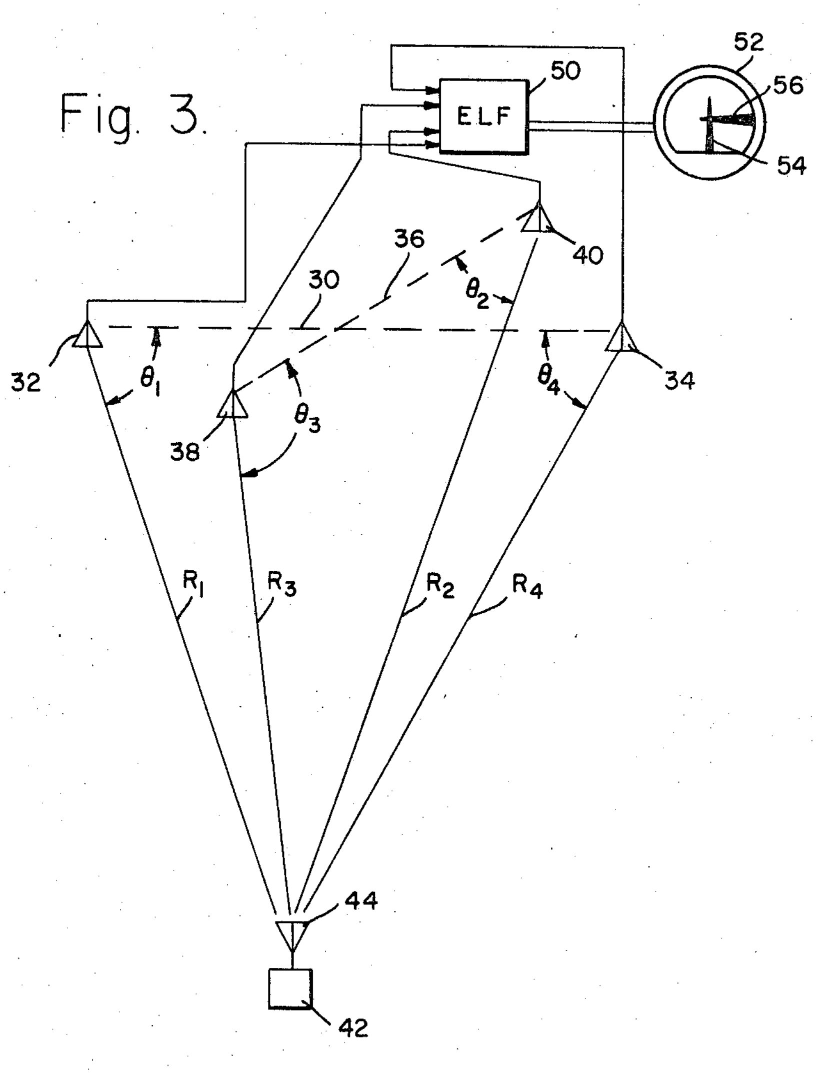
FIG. 3 is a diagram, partly in block, illustrating the geometric relationships of the elements of an electronic location finder according to the present invention.

In FIG. 3, the configuration of four antennas with mutually orthogonal, crossed base lines permits the assumption of a "pointing vector," which is orthogonal to the plane defined by the crossed base lines. As shown in FIG. 3, the base line 30 of a first antenna pair 32, 34 is orthogonal to the base line 36 of the second antenna pair 38, 40. The reference plane defined by the two base lines 30, 36 is fixed in a predetermined spatial relationship to the vehicle (not shown).

A remote transmitter 42 having an antenna 44 radiates a signal to each of the antennas. The distance to each of the antennas can be represented by the terms $R_1$, $R_2$, $R_3$, $R_4$. When these four distances are equal, then the "pointing angles" between the "boresight" line of each of the antennas and the line to the transmitting antenna 44 will be equal.

The antennas are connected to the Electronic Locating Finding system (ELF) 50 of the present invention, which drives a display 52. As illustrated, the display 52 can be of the cross-pointer type in which the vertical and horizontal pointers 54, 56 are centered, when the transmitter antenna 44 is exactly equidistant from the system antennas and, therefore, the remote transmitter 42 is directly aligned with the system 50.

Figure 4:
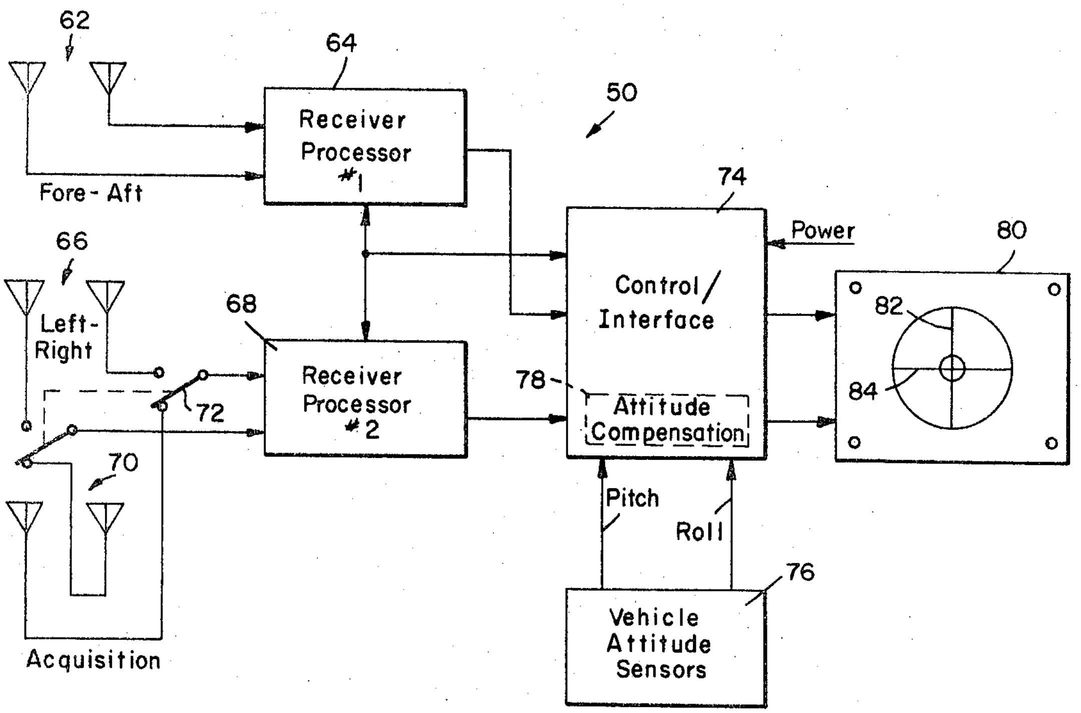
FIG. 4 is a basic block diagram of the electronic location finder of the present invention.

In FIG. 4, there is shown a typical system 50, according to the present invention. A first antenna pair 62 is designated "Fore-Aft" and is connected to a first receiver-processor 64.

A second antenna pair 66, designated "Left-Right," is adapted to be connected to a second receiver-processor 68. A third antenna pair 70, designated "Acquisition" but functioning as an auxiliary, left-right pair, is also adapted to be connected to the second receiver-processor 68 and a switch system 72 alternatively connects a one of the second and third pairs 66, 70 to the second receiver-processor 68. A Control/Interface unit 74 furnishes energizing power to the receiver-processors 64, 68 and receives the signal outputs therefrom.

A block, designated Vehicle Attitude Sensors 76 corresponds to the existing attitude sensors on the vehicle and applies, in this example, "Pitch" and "Roll" signals to an Attitude Compensation portion 78 of the Control/Interface unit 74. The Control/Interface unit 74 is connected to apply inputs to a display device 80 of the cross-pointer type, in which the vertical element 82 is driven to the right or left by the output of the second receiver-processor 68 and the horizontal member 84 is driven by the output of the first receiver-processor 64.

In operation, the acquisition antenna pair 70 is initially connected to the second receiver-processor 68, which causes the vertical needle 82 to deflect in a manner that would indicate to the vehicle operator the heading that must be followed to point towards the remote transmitter. The acquisition antenna pair 70 will be detecting a useful signal long before the Fore-Aft antenna pair 62 receives a strong signal. As a matter of design choice, the horizontal indicator 84 may be held off scale.

As the vehicle is "pointed" to the remote transmitter, the vertical indicator 82 will be centered. Minor perturbations in vehicle attitude, such as "pitch" and "roll," can be sensed by the attitude sensors 76 and appropriate corrections can be made through the attitude compensation circuitry 78, so that attitude changes are not erroneously interpreted as changes in location of the remote transmitter.

As the vehicle approaches the remote transmitter, the signal from the first receiver-processor 64 will exceed a predetermined threshold which brings the horizontal indicator 84 into view. Since the acquisition antenna pair 70 is "forward looking," it becomes desirable to switch to the Left-Right antenna pair 66, to provide a better indication of the location of the transmitter as the vehicle reaches a predetermined intercept area. The Left-Right antenna pair 66 is coplanar with the Fore-Aft pair 62 and is more sensitive within the intercept area.

When the vehicle is directly above the remote transmitter, both the vertical and horizontal indicators 82, 84 will be centered in the display 80 and the vehicle, if so equipped, can hover over the transmitter. If not, the vehicle can loiter in the area and can "pinpoint" the location of the transmitter.

Figure 5:
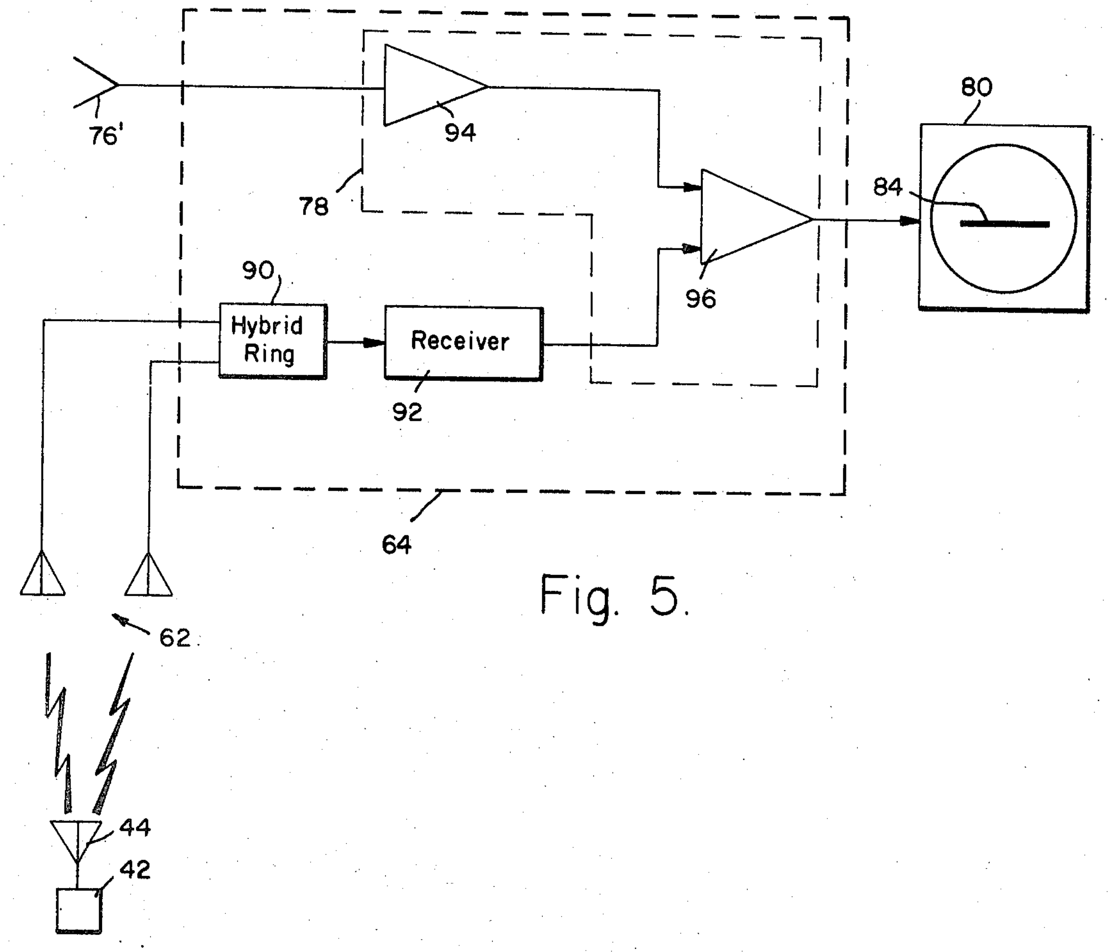
FIG. 5 is a more detailed block diagram of the Receiver-Processor 1 portion of the system of FIG. 4.

In FIG. 5 there is shown in slightly greater detail the first receiver-processor 64 and the elements associated therewith. The Fore-Aft antenna pair 62 apply signals to a hybrid ring circuit 90, which provides an output signal to a receiver 92. An attitude sensor 76′, which provides information relating to, for example, the pitch angle, applies an input to a first signal conditioning amplifier 94. The output of the receiver 92 and the signal conditioning amplifier 94 are applied to a summing, buffer amplifier 96, the output of which drives the display 80 and, more particularly, the horizontal bar 84 of the display 80.

Figure 6:
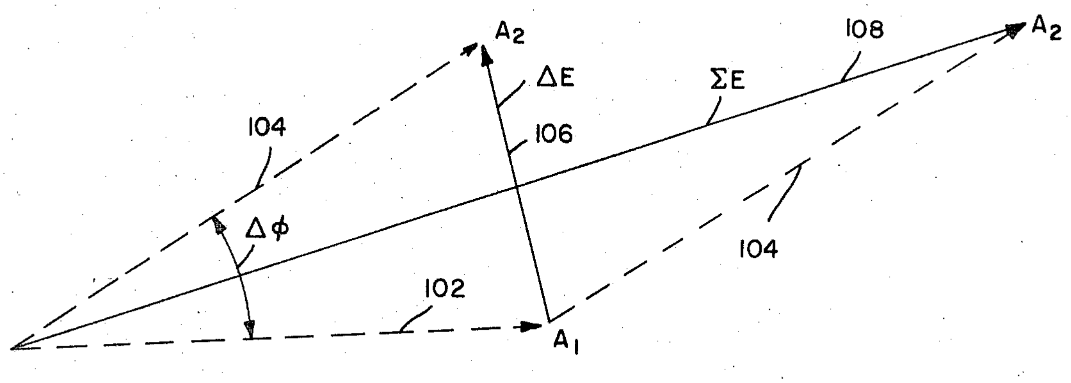
FIG. 6 is a vector diagram illustrating the use of a hybrid ring.

Turning now to FIG. 6, there is shown a vector diagram which illustrates the operation of a particular mixer useful in the present invention and which is commonly known as a hybrid ring. A hybrid ring receives the signals from the two antennas. The amplitudes of these two signals are substantially equal, but a difference in phase, $\Delta\phi$ will exist unless a perpendicular to the antenna base line is aligned with the remote transmitter. The hybrid ring provides a first or "difference" signal and a second or "sum" signal.

As illustrated in FIG. 6, a first vector 102 corresponds to the signal received at a first antenna and a second vector 104 corresponds to the signal received at the second antenna. As noted, the vectors are separated by an angle $\Delta\phi$.

The vector difference, as between the signals, is represented by a third vector, $\Delta E$ 106, whose magnitude is defined as $$\Delta E=2E \sin \frac{\Delta\phi}{2} \quad (4)$$

The vector sum output is represented by a vector $\Sigma E$, 108, whose magnitude is represented by the expression:

$$\Sigma E=2E \cos \frac{\Delta\phi}{2} \quad (5)$$

In these expressions, E represents the input signal amplitude. ΔE represents the hybrid ring first or difference signal output and ΣE corresponds to the hybrid ring second or sum signal output.

If $\Delta\phi$ is 0, and the signals are in phase, the difference signal ΔE is 0 and the sum signal ΣE reaches a maximum value, which is twice the amplitude of the signal received by either input.

Generally, the difference signal ΔE is the more important signal since, at null, the antennas are pointing directly toward the remote transmitter. The ΣE or sum signal can be used as a reference, and as an automatic gain control to provide some insensitivity of the system to variations in the ΔE signal arising from space attenuation, reflections, and other phenomena, which could affect the ΔE signal as the signal nears null.

Figure 7:
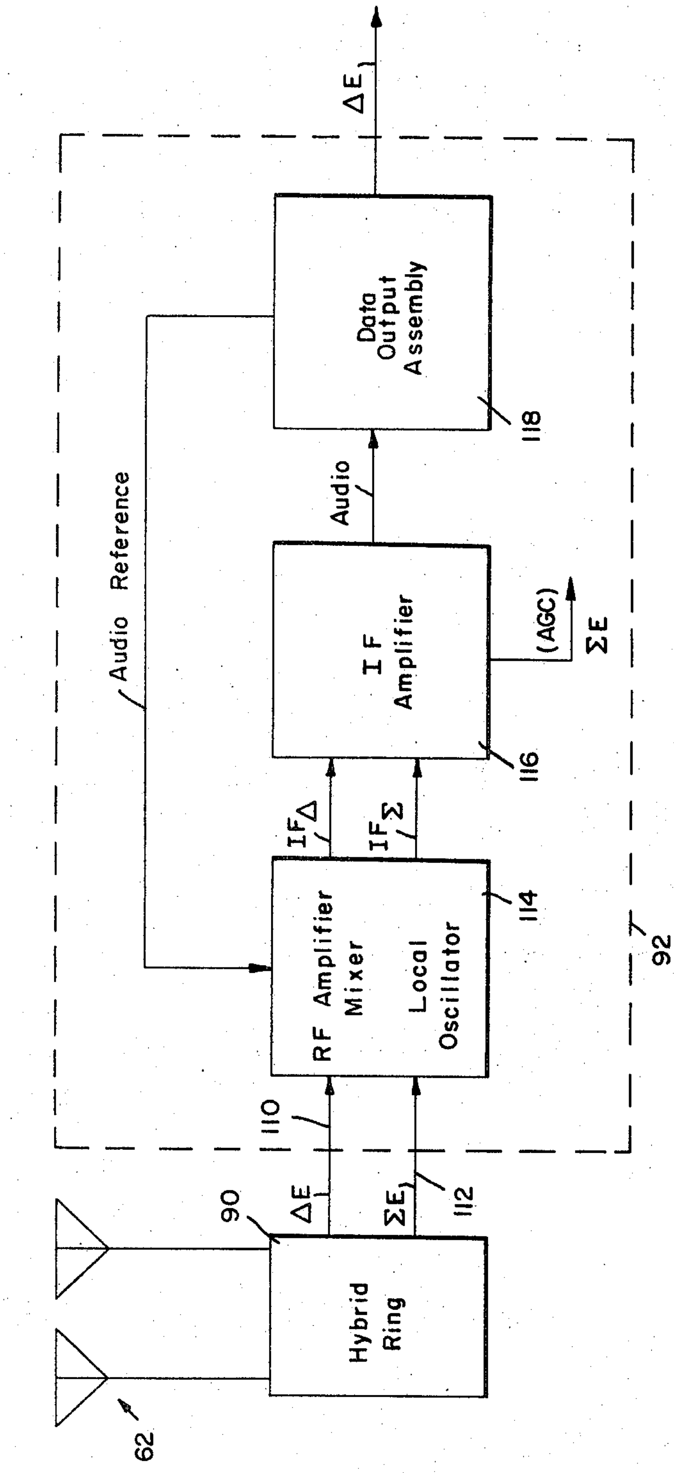
FIG. 7 is a block diagram of one of receiver-processors of FIG. 4, in somewhat greater detail.

Turning next to FIG. 7, there is shown a simplified block diagram of the elements of the receiver 92, indicated in block in FIG. 5. As shown in FIG. 7, the antenna pair 62 is connected to the hybrid ring 90 which provides a difference signal ΔE on a first channel 110 and a sum signal ΣE on a second channel 112.

The signals are applied to an R.F. Amplifier Mixer 114 which includes a pair of substantially identical R.F. Amplifier Mixer stages which increase signal power and convert the received signals to an Intermediate Frequency.

Amplitude and phase relationships of the input signals are preserved in the Amplifier Mixer 114, and the Intermediate Frequency signals produced are applied to an I.F. Amplifier assembly 116. An audio-frequency reference signal is applied to the R.F. Amplifier Mixer 114 to "code" the difference signal ΔE, to permit separation and recovery after I.F. amplification. As will be explained in greater detail below, a balanced modulator alternately reverses the phase of the difference signal at the reference audio frequency signal rate.

The I.F. signal outputs $IF_\Delta$ and $$IF_\Sigma$$

of the R.F. Amplifier Mixer 114 in the I.F. Amplifier assembly 116 are separated to provide a ΣE output, also designated AGC, and an audio frequency signal which contains the ΔE signal. The audio frequency signal is applied to a Data Output assembly 118, in which the reference audio frequency signal is generated. When mixed with the audio output of the I.F. Amplifier assembly 116, a D.C. signal is produced which is proportional to and representative of the difference signal ΔE.

Figure 8:
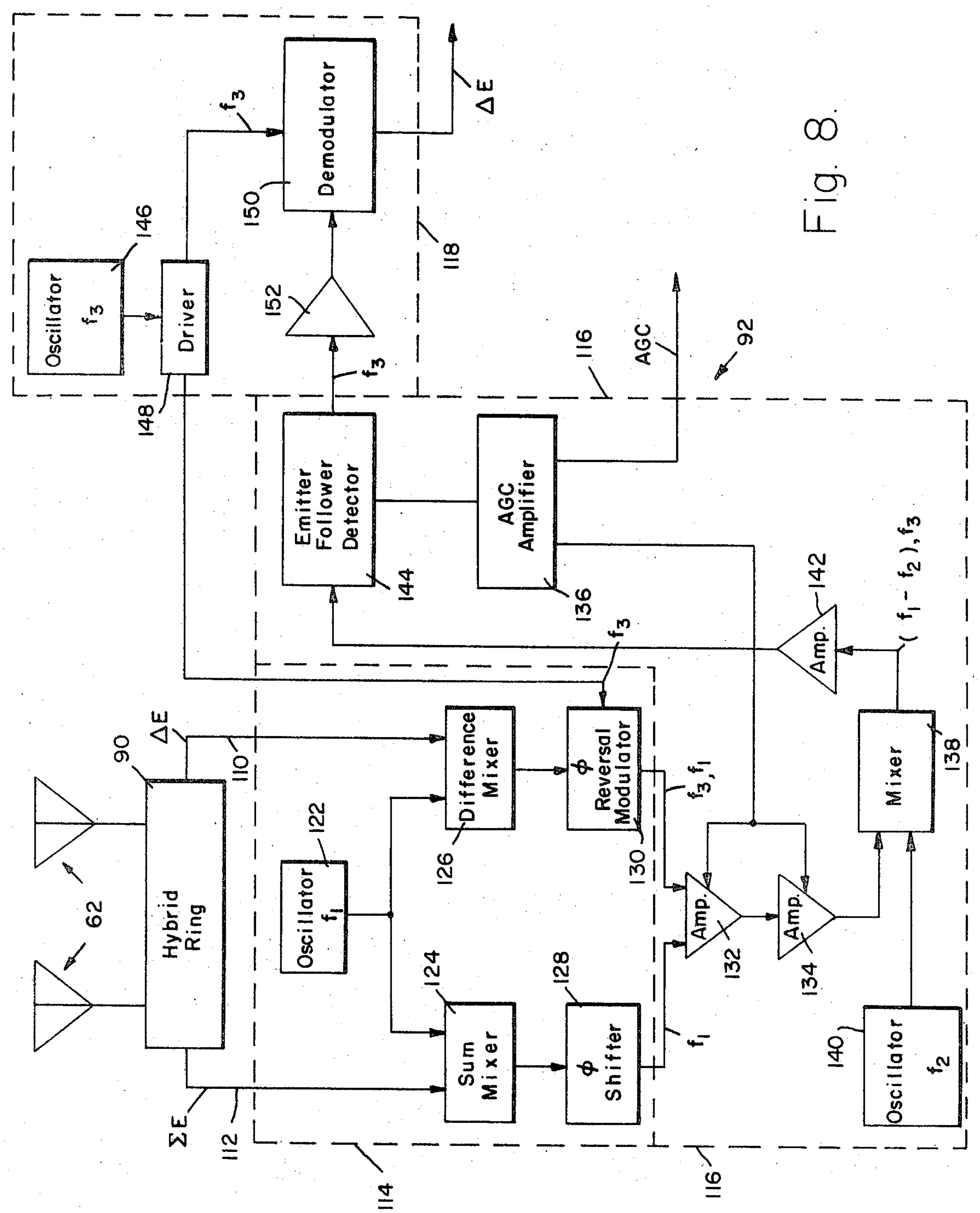
FIG 8 is a detailed block diagram of the system of FIG. 7.

FIG. 8 illustrates, in block form· the details of the receiver 92 and shows, in greater detail, the elements comprising the receiver block 92 of FIG. 7. The R.F. Amplifier Mixer 114 includes an I.F. oscillator 122, which generates a signal having a frequency $f_1$ higher than the received frequency such that, when mixed with the carrier frequency received from the remote transmitter, provides a suitable intermediate frequency (I.F.) signal at frequency $f_1$.

The ΣE output of the hybrid ring is applied to a Sum Mixer 124 where it is combined with the output of the oscillator 122 and, similarly, the ΔE output of the hybrid ring 90 is applied to a Difference mixer 126, which also receives an input from the oscillator 122. The output of the Sum Mixer 124 is applied to a phase shifter 128· which shifts the phase by 90°. Since the vector sum signal ΣE and the vector difference signal ΔE are in quadrature at the outputs of the hybrid ring 90, it is necessary to shift phase for proper vector addition in the succeeding I.F. circuits.

The output of the Difference Mixer 126 is applied to a Phase Reversal Modulator 130 which is controlled by an audio frequency signal $f_3$, which is provided from the Data Output Assembly 118. The outputs of the Phase Reversal Modulator 130 are the upper and lower sidebands of a suppressed carrier type amplitude modulation at frequencies $(f_3+f_1)$ and $(f_3-f_1)$. At null, with no difference signal present, incoherent noise signals are produced in the alternate half cycles and result in a double frequency modulation which is not detected in the Data Output Assembly 118.

The resulting Sun channel signal is then an I.F. signal at frequency $f_1$, while the Difference channel signal is an I.F. signal pair at $f_1$ plus and minus the modulating audio frequency signal $f_3$. Both the Sum and Difference signals from the R.F. Amplifier Mixer 114 are applied to the I.F. Amplifier Assembly 116.

In the I.F. Amplifier 116, first I.F. Amplifier stage 132 additively amplifies the Sum and Difference outputs. The resulting output is applied to a second I.F. Amplifier stage 134. The output of an AGC Amplifier 136 controls the gain of the I.F. Amplifier stages 132, 134.

The output of the second I.F. Amplifier stage 134 is applied to a Mixer 138, which receives the output of an Oscillator 140 operating at a frequency $f_2$. The output of the Mixer 138 is applied to an Amplifier 142. The resulting signal is at the difference frequency $f_1-f_2$, modulated by the $f_3$ signal containing the Difference information. This signal is then applied to an Emitter Follower Detector stage 144, which extracts the modulation signal $f_3$ which si applied to the Data Output Assembly 118.

The Emitter Follower Detector 144 also derives a D.C. signal which is filtered and applied to drive the AGC Amplifier 136. A first output of the AGC Amplifier is fed back to the first and second I.F. Amplifier stage 132, 134, as described above, and a second output is supplied as an external signal, corresponding to the ΣE (AGC) output which can be utilized in conventional cross-pointer indicators to drive the "flag."

Within the Data Output Assembly block 118, a third, audio-frequency oscillator 146 generates the audio-frequency reference signal $f_3$, which is applied to a driver stage 148, the output of which is applied both to the Phase Reversal Modulator 130 in the R.F. Amplifier Mixer 114, and to a Demodulator circuit 150. A second input to Demodulator circuit 150 is provided by an Amplifier 152 which is driven by the audio output of the Emitter Follower Detector stage 144 of the I.F. Amplifier 116.

The output of the Demodulator 150 is a D.C. signal corresponding to and representative of the ΔE input signal and which provides a null signal when a vector to the remote transmitter is orthogonal to the base line of the antenna pair.

Figure 9:
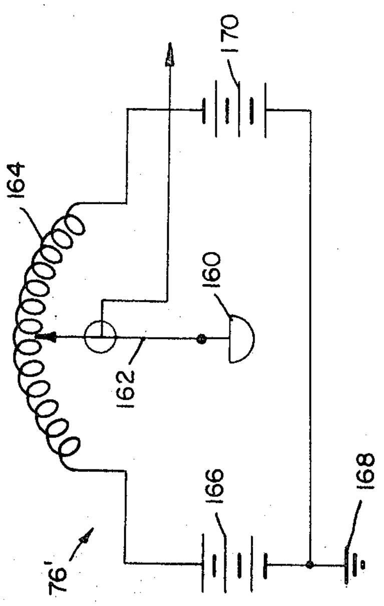
FIG. 9 is a diagram, partially schematic, of a source of signals to the attitude compensation block of FIG. 4.

In FIG. 9, there is shown a representational sketch of a possible attitude sensor 76', useful in connection with the system of the present invention for detecting, for example, either Pitch or Roll. A pendulous member 160 is pivotally mounted to the vehicle frame and is connected to a potentiometer tap 162. A potentiometer slide wire 164 is fixedly mounted on the vehicle frame and cooperates with the tap 162 which is normally centered with respect to the slide wire 164.

One end of the potentiometer wire 164 is connected to, for example, the positive terminal of a voltage source 166, the negative terminal of which is connected to a common reference potential 168 indicated by the conventional ground symbol. The other end of potentiometer 164 is connected to the relatively negative terminal of a second voltage source 170, the negative terminal of which is connected to the common reference 168.

It will then be seen that with the vehicle in its normal attitude, the tap 162 will be centered and the voltage output will be substantially 0 volts. However, if the attitude of the vehicle shuold change, for example, by rotating the potentiometer coil 164 in the clockwise direction, a relatively positive voltage signal will be produced at the tap 162, the magnitude of which is proportional to the amount of rotation. Similarly, if the coil 164 should rotate in the counterclockwise direction, a negative polarity voltage signal will be generated, the magnitude of which is also related to the amount of rotation. The output of the attitude sensor 76' can be applied to a simple summing network in parallel with the output of a receiver-processor to drive the display.

Figure 10:
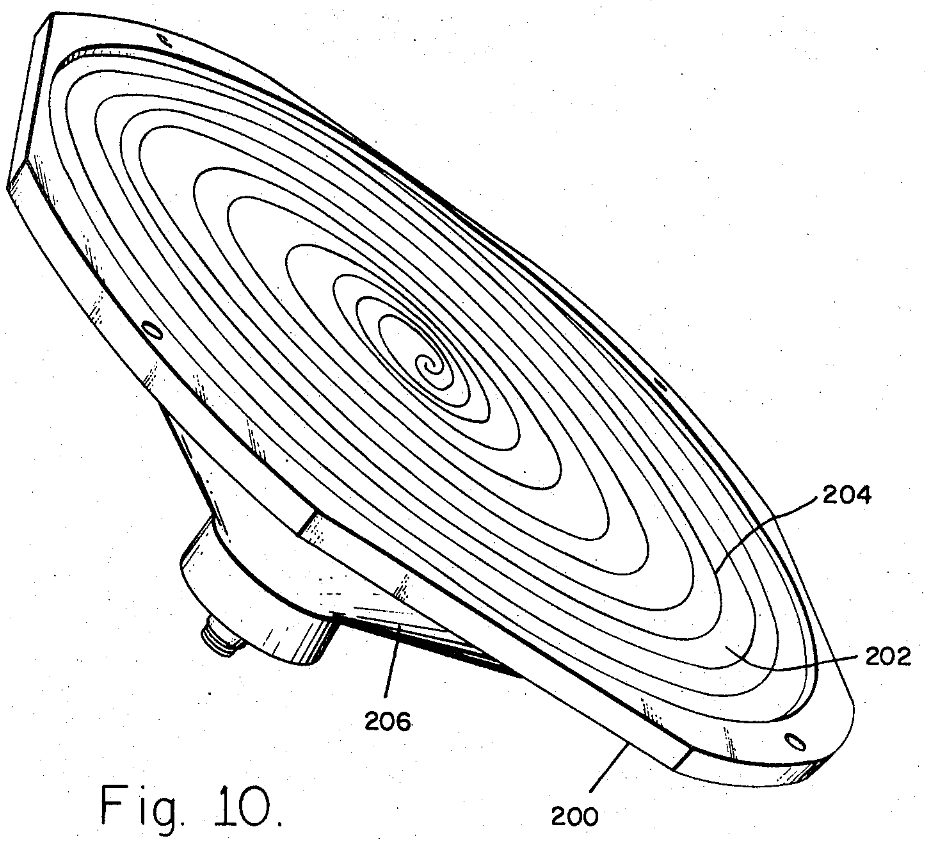
FIG. 10 is a perspective view of an Archimedes spiral antenna suitable for use in the present invention.

Turning now to FIG. 10, there is shown, in prespective, an Archimedes spiral antenna 200 which is suitable for use in a system according to the present invention. As shown, the antenna 200 includes a planar sheet 202 which has etched therein a radiator 204 in the form of a two-arm modified spiral of Archimedes. Backing the spiral radiator is a cavity or enclosure 206 which conforms to the "aperture" of the spiral.

In alternative embodiments, the antenna may be modified to assume a square or rectangular shape and the spiral may be modified accordingly. The cavity may be filled with a rigid, closed cell dielectric foam to avoid problems of pressure differentials if mounted on an airborne vehicle. Suitable Archimedes spiral antennas are generally offered for sale by Transco Products, Inc. of Venice, Calif.

The Archimedes spiral antenna has been chosen in the preferred embodiment for several reasons. Primarily, the antenna is relatively insensitive to the orientation of the transmitting antenna and does not itself require any particular attitude. The geometry of the antenna is such to permit flush mounting on a vehicle to provide low aerodynamic drag and greater freedom from accidental damage in normal vehicle handling operations. Further, the spiral antenna provides excellent isolation properties and permits the antennas of a pair to be mounted at the desired $\lambda/2$ spacing. Moreover, interference from adjacent vehicle antennas is minimized.

In operation, the system of the present invention will be able to "head" a vehicle to a remote transmitter. The attitude compensation circuits, which are connected to the vehicle attitude sensors, prevent the system from construing as changes in the location in the remote transmitter, minor changes in vehicle attitude.

The first or Acquisition Left-Right pair of antennas permits a remote transmitter to be detected at extreme ranges, while the second Left-Right pair, which is utilized when in proximity to the transmitter, enables the vehicle to remain on station at the closest point of approach.

Other variations and modifications of the present invention will appear to those skilled in the art, and the scope of the present disclosure should be limited only by the claims appended hereto. What is claimed as new is:

1. The combination, with a vehicle, of apparatus for locating a remote radiating signal source, the apparatus comprising:

(a) a first antenna pair separated by a base line, fixedly mounted to the vehicle in a predetermined location, said antenna pair being adapted to receive radial signals from a remote radiating signal source;

(b) receiver-processor means connected to said antenna pair and responsive to received radiation signals for generating first and second signals respectively corresponding to and representative of the sine and cosine of the angle between said base line and a line from said base line to the remote source; and (c) attitude compensation means, adapted to be coupled to vehicle attitude sensors, connected to said receiver-processor means for generating vehicle guidance signals corresponding to and representative of the difference between actual vehicle orientation and vehicle orientation necessary to make orthogonal the line from said base line to the signal source;

whereby said vehicle guidance signals are substantially independent of vehicle attitude changes.

2. Apparatus of claim 1, wherein the antennas of said antenna pair are cavity backed Archimedes spiral antennas, coplanar with said base line.

3. Apparatus of claim 1 further including display means for providing a visual display of said vehicle guidance signals.

4. Apparatus of claim 1, wherein the vehicle attitude sensors provide "roll" representing signals to said receiver-processor means for making said vehicle guidance signals independent of vehicle "roll."

5. Apparatus of claim 1, wherein the vehicle attitude sensors provide "pitch" representing signals to said receiver-processor means for making said vehicle guidance signals independent of vehicle "pitch."

6. Apparatus of claim 1, wherein said first antenna pair comprises a "forward-looking" right-left antenna pair for providing target acquisition information to said receiver-processor means, whereby said vehicle guidance signals furnish "right-left" steering information.

7. Apparatus as in claim 6, above, further including:

(a) a second antenna pair separated by a second base line parallel to said base line, fixedly mounted to the vehicle and rotated about said second base line to be "downward-looking" with respect to the vehicle; and (b) switching means for alternatively connecting said first or said second antenna pair to said receiver-processor, whereby said second antenna pair provides "right-left" hovering information and said vehicle guidance signals furnish "right-left" hover steering information.

8. Apparatus of claim 1 further including:

(a) a second antenna pair separated by a second base line, fixedly mounted to the vehicle in a predetermined location, said second antenna pair being adapted to receive radiated signals from the remote radiating signal source;

(b) second receiver-processor means connected to said second antenna pair and responsive to received radiation signals for generating third and fourth signals respectively corresponding to and representative of the sine and cosine of the angle between said second base line and a line from said second base line to the remote source; and (c) means coupling said attitude compensation means to said second receiver-processor, said attitude compensation means further generating second vehicle guidance signals corresponding to and representative of the difference between actual vehicle orientation and vehicle orientation necessary to make orthogonal the line from said second base line to the signal source.

9. Apparatus as in claim 8, above, wherein said second base line is orthogonal to said base line.

10. Apparatus of claim 9, above, wherein said attitude compensation means include cross-pointer display means, one of said pointers being connected to display information derived from the first receiver-processor and the other of said pointers being connected to display information from said second receiver-processor.

11. Apparatus of claim 9, above, further including:

(a) a third antenna pair separated by a third base line parallel to the first said base line, fixedly mounted to the vehicle and rotated about said third base line relative to said first antenna pair; and (b) switching means for alternatively coupling said first antenna pair or said third antenna pair to said receiver-processor means, whereby said attitude compensation means generates target acquisition steering signals in response to signals from one of said first and third antenna pairs, and hover steering signals in response to signals from the other of said first and third antenna pairs.

12. Apparatus as in claim 11, above, wherein the vehicle is a helicopter, said first antenna pair is a "right-left" pair adapted to be "forward-looking" with respect to the vehicle, said second antenna pair is a "fore-aft" pair adapted to be "downward-looking" and said third antenna pair is also a "right-left" pair adapted to be "downward-looking," whereby radiation received by said first antenna pair furnishes acquisition steering signals and radiation received by said second and third antenna pairs furnishes hover steering signals.

References Cited

UNITED STATES PATENTS

| | | | |
|---|---|---|---|
| 2,419,603 | 4/1947 | Smith | 181—0.5 |
| 3,090,957 | 5/1963 | Albanese et al. | 343—112 |
| 3,131,393 | 4/1964 | Oppedahl | 343—114 |
| 3,378,848 | 4/1968 | Baylor | 343—113 |

RODNEY D. BENNETT, Jr., Primary Examiner
R. E. BERGER, Assistant Examiner

U.S. Cl. X.R.

343—114